D. METZGER.
POMPON.
APPLICATION FILED APR. 17, 1911.

1,014,408.

Patented Jan. 9, 1912.

Witnesses:
William Miller
Christian W. Almstaedt

Inventor
David Metzger
By his Attorneys

UNITED STATES PATENT OFFICE.

DAVID METZGER, OF NEW YORK, N. Y.

POMPON.

1,014,408.  Specification of Letters Patent.  Patented Jan. 9, 1912.

Application filed April 17, 1911. Serial No. 621,660.

*To all whom it may concern:*

Be it known that I, DAVID METZGER, a citizen of the United States, residing at New York, in the county of New York and State of New York, have invented new and useful Improvements in Pompons, of which the following is a specification.

My invention relates to a new and improved method of constructing a pompon. These pompons are used for a great variety of millinery trimmings but principally for trimming hats. Pompons are made of chenille and similar materials, also silk straw known as ribbozine.

Heretofore ribbozine pompons have been made by taking a braid of silk straw known as ribbozine and rolling it up unto a round ball of any desired size. The result thus attained is a ball having a smooth exterior.

My invention consists in constructing a pompon by curling the loose ends of the braid formed of ribbozine, so that when the ribbozine braid is rolled up, the pompon has a loose and curly effect resembling a chrysanthemum.

By constructing the pompon in accordance with my invention, there is not only attained a new and very desirable effect, but there is also a great saving of material, it requiring only about one half as much ribbozine to make a pompon in accordance with my invention as is required in the old way.

Figure 1:
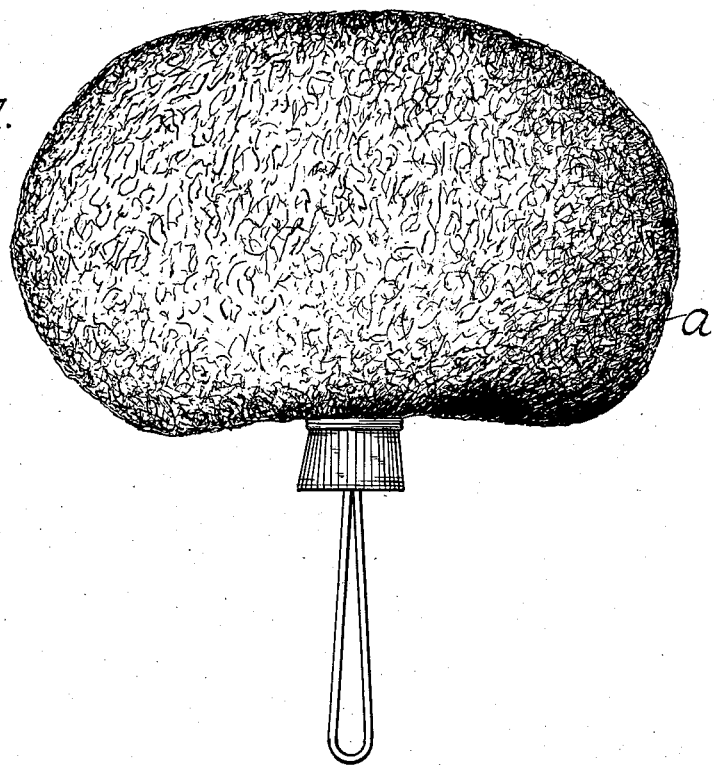
Figure 2:
Figure 3:
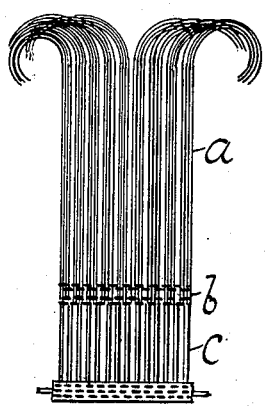
Figure 4:
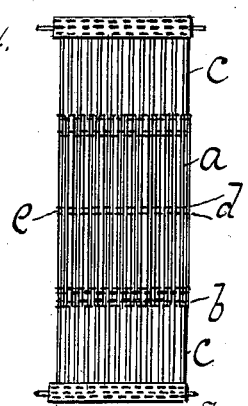

In the accompanying drawings Figure 1 is a side elevation of a pompon made according to my invention. Fig. 2 shows a strand of ribbozine made of silk threads. Fig. 3 shows a braid of ribbozine from one side of which the selvage is cut and the loose ends of the ribbozine are curled preparatory to rolling the braid into a ball. Fig. 4 is a view of the silk strips woven together and cut in the middle.

The ribbozine designated by the letter $a$ in Fig. 2 is made by having a plurality of strips of silk passed through a preparation of gum until the strips are stuck together and then the entire strip is passed through heated rollers which polish them and produce the strip $a$ shown in Fig. 2. This silk strip when produced in this manner is commercially known as ribbozine.

In constructing my pompon I weave a series of ribbozine strips $a$ back and forth in a knitting machine or any other suitable manner and form a braid such as shown in Fig. 4, having a selvage or warp $b$ consisting of cotton threads or similar material $c$. Down the center of the strips $a$ two guiding seams $d$ are formed and when a desirable quantity of the braid is attained, the center $e$ between the two strips $d$ is cut through and the stitches $d$ are pulled out leaving a series of silk threads $a$ secured at $b$ to a cotton warp $c$. The loose ends of the ribbozine flues $a$ are then curled at $f$ as shown in Fig. 3. This curling may be done by hand or by machine if desired and is the essential part of the invention in that it gives the pompon the curly chrysanthemum-like effect shown in Fig. 1 and also saves a great amount of material for the reason that the loose ends being curled in all directions and all protruding they produce the pompon effect much quicker and with much less material than when the straight strips are rolled up close together as has been done heretofore.

I claim:—

1. A pompon constructed of strips of silk woven together so as to form a braid, one side of said braid consisting of cotton or similar material, the edge cut from the other side of the braid and the loose ends of the silk strips curled and the whole braid rolled into a pompon as shown and described.

2. A pompon comprising a plurality of looped strips of ribbozine having their free ends curled, and a cotton warp secured to the looped portions of the strips for supporting the same, said warp being rolled upon itself to bunch the curled ends of the strips.

3. A pompon comprising looped strips of ribbozine curled at their free ends, and cotton strips secured to the looped portions of the ribbozine strips and extending longitudinally through the same, said cotton strips being clustered to bunch said ribbozine strips.

In testimony whereof I have hereunto set my hand in the presence of two subscribing witnesses.

DAVID METZGER.

Witnesses:
WM. E. WARLAND,
CHRISTIAN H. ALMSTAEDT.